United States Patent
Gould et al.

(10) Patent No.: US 9,994,232 B2
(45) Date of Patent: Jun. 12, 2018

(54) DYNAMIC ASSIGNMENT OF DRIVER IDENTIFIERS AND RELATED ADJUSTMENT OF VEHICLE SETTINGS BASED ON DETECTION OF DRIVER IDENTIFIERS

(71) Applicant: GM GLOBAL TECHNOLOGY OPERATIONS LLC, Detroit, MI (US)

(72) Inventors: Sue A. Gould, Okemos, MI (US); Douglas C. Martin, Oxford, MI (US); Mark J. Glaza, Warren, MI (US); Ron Y. Asmar, West Bloomfield, MI (US); David T. Proefke, Troy, MI (US); Charles J. Bongiorno, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 15/192,716

(22) Filed: Jun. 24, 2016

(65) Prior Publication Data
US 2017/0369071 A1    Dec. 28, 2017

(51) Int. Cl.
| | |
|---|---|
| *H04W 48/02* | (2009.01) |
| *B60W 50/08* | (2012.01) |
| *B60W 50/12* | (2012.01) |
| *B60K 35/00* | (2006.01) |
| *H04W 48/08* | (2009.01) |
| *B60W 50/00* | (2006.01) |
| *B60R 25/24* | (2013.01) |

(52) U.S. Cl.
CPC ......... *B60W 50/0098* (2013.01); *B60R 25/24* (2013.01); *B60W 2540/28* (2013.01)

(58) Field of Classification Search
None
See application file for complete search history.

(56) References Cited

U.S. PATENT DOCUMENTS

2014/0142805 A1 * 5/2014 Frye ................... B60R 16/023
701/36

* cited by examiner

*Primary Examiner* — Adam D Tissot
(74) *Attorney, Agent, or Firm* — Lorenz & Kopf, LLP

(57) ABSTRACT

An automated vehicle configuration system for a host vehicle is presented here. The system includes a driver identifier module onboard the host vehicle, and a subsystem onboard the vehicle. The driver identifier module has a database and a processor device to execute processor-executable instructions. The database has database objects, each having a driver identifier, at least one key fob code, and at least one mobile device identifier. The processor device executes the instructions to dynamically populate and update the database objects such that key fob codes are dynamically assigned and reassigned to driver identifiers. The subsystem has user-specific configurable settings associated with the driver identifier objects. Selection of an active driver identifier results in the loading of corresponding settings for the subsystem.

19 Claims, 3 Drawing Sheets

DYNAMIC ASSIGNMENT OF DRIVER IDENTIFIERS AND RELATED ADJUSTMENT OF VEHICLE SETTINGS BASED ON DETECTION OF DRIVER IDENTIFIERS

TECHNICAL FIELD

Embodiments of the subject matter described herein relate generally to the control and operation of onboard vehicle subsystems. More particularly, embodiments of the subject matter relate to methodologies for automatically personalizing vehicle features and subsystems based on user-specific identifiers.

BACKGROUND

Most modern vehicles can be locked and unlocked using wireless key fob devices. Moreover, many modern vehicles utilize keyless remote devices (key fob devices having no physical key associated therewith) for vehicle access and startup. A new vehicle is typically sold with two or perhaps three key fob devices, and each key fob device includes a unique device identifier (ID), such as a digital key fob code. A key fob code can be associated with user-specific configuration settings, preferences, vehicle options, or the like. In this regard, driver-personalized settings can be implemented when the vehicle detects the presence of a particular key fob (these driver-specific settings can include: seat and mirror positions; instrument panel display options; entertainment system settings; navigation system settings; drivetrain operating modes; climate control system settings; etc.). Thus, the key fob code that identifies a first key fob for a vehicle can be linked to user-specific settings for a first driver, and the key fob code that identifies a second key fob for the same vehicle can be linked to user-specific settings for a second driver, and so on.

Traditional techniques associate vehicle personalization settings to key fobs. Accordingly, personalized vehicle settings linked to a particular key fob code will be activated whenever that key fob code is detected, regardless of who might be carrying the key fob and regardless of who might be driving the vehicle. Such traditional techniques make it difficult to assign and reassign users to key fobs in an ongoing manner. Moreover, such traditional methodologies can be inconvenient and frustrating for drivers who share key fobs.

Accordingly, it is desirable to have a dynamic approach for assigning user-specific vehicle settings to drivers. In addition, it is desirable to have an improved approach for determining the identity of a driver based on information and/or data that can be detected by the vehicle (for purposes of implementing user-specific vehicle settings for the identified driver). Furthermore, other desirable features and characteristics will become apparent from the subsequent detailed description and the appended claims, taken in conjunction with the accompanying drawings and the foregoing technical field and background.

BRIEF SUMMARY

An automated vehicle configuration system for a host vehicle is presented here. An embodiment of the system includes a driver identifier module onboard the host vehicle. The driver identifier module includes a database, a computer readable storage medium storing processor-executable instructions, and a processor device to execute the processor-executable instructions. The database includes a plurality of database objects, each of the database objects having a driver identifier, at least one key fob code, and at least one mobile device identifier. The processor device executes the processor-executable instructions to dynamically populate and update the database objects such that key fob codes are dynamically assigned and reassigned to driver identifiers. The system also includes a subsystem onboard the host vehicle. The subsystem has user-specific configurable settings associated with the driver identifier objects.

A vehicle is also presented here. An embodiment of the vehicle includes a key fob receiver, a short range wireless receiver, a driver identifier module, and a subsystem onboard the vehicle. The key fob receiver receives a key fob code that identifies a key fob device. The short range wireless receiver receives a mobile device identifier that identifies a mobile device. The driver identifier module includes a database, a computer readable storage medium storing processor-executable instructions, and a processor device to execute the processor-executable instructions. The database includes a plurality of database objects, each of the database objects having a driver identifier, at least one key fob code, and at least one mobile device identifier. The processor device executes the processor-executable instructions to dynamically populate and update the database objects such that key fob codes are dynamically assigned and reassigned to driver identifiers. The subsystem has user-specific configurable settings associated with the driver identifiers and with user profile identifiers. The processor device executes the processor-executable instructions to process the received key fob code and the received mobile device identifier, and to select, from the plurality of database objects, an active driver identifier that corresponds to the received key fob code and the received mobile device identifier.

An automated vehicle configuration system for a host vehicle is also presented here. The system includes: a key fob receiver to receive a key fob code that identifies a key fob device; a short range wireless receiver to receive a mobile device identifier that identifies a mobile device associated with a user; and a driver identifier module having a processor device and a computer readable storage medium storing processor-executable instructions. The processor device executes the processor-executable instructions to process the received key fob code and the received mobile device identifier, select one of a plurality of driver identifiers to serve as an active driver identifier, the selection determined at least in part by the received key fob code and the received mobile device identifier, and communicate the active driver identifier to a subsystem of the host vehicle. The subsystem loads user-specific settings associated with the active driver identifier.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
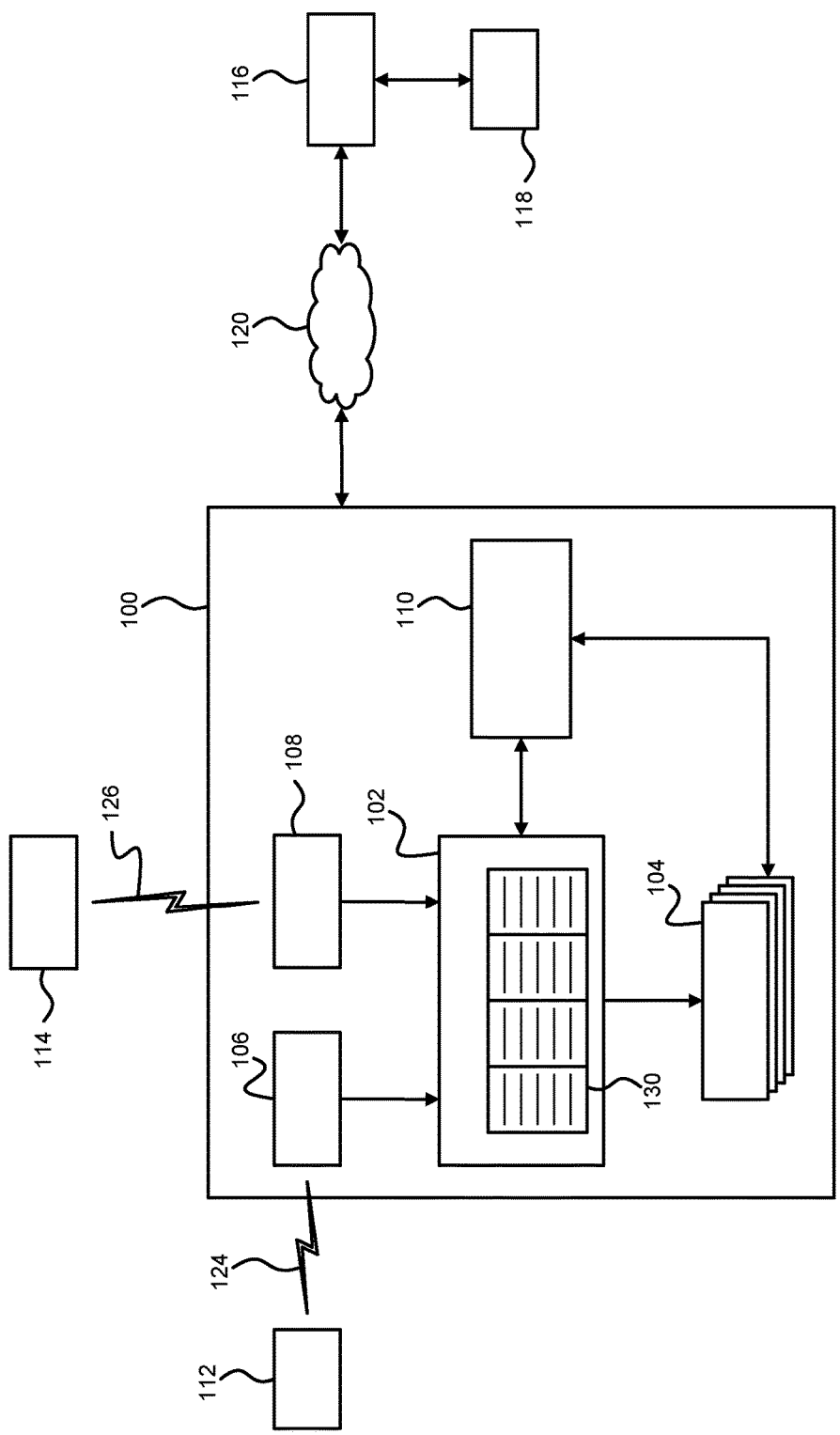
FIG. 1 is a block diagram representation of an embodiment of an automated configuration system for a vehicle.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, a program, or an app, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The subject matter presented here relates to improved techniques and methodologies for automatically configuring one or more subsystems onboard a host vehicle in accordance with driver-specific settings, options, preferences, or the like. To this end, the exemplary embodiment described herein dynamically assigns and reassigns (as needed) driver identifiers to: key fobs (using, for example, the associated key fob codes); mobile devices (using, for example, device identifiers, physical device addresses, BLUETOOTH wireless protocol identifiers, or the like); cloud-based user profiles; and/or other detectable or identifiable items that might be linked to or otherwise associated with a driver. For example, a driver identifier (ID) database can be maintained and dynamically updated as needed to assign and reassign a key fob and/or a mobile device to each driver ID database object. Moreover, a driver ID can be flagged as being linked to a user profile, which may be maintained as an online profile or otherwise. Additionally or alternatively, the driver ID database can directly map user profiles to driver IDs. Thus, an automated vehicle configuration system onboard the host vehicle can reliably identify the current driver based on the detection of a key fob and/or a mobile device carried by the driver, and then configure the vehicle in accordance with settings that are linked to the identified driver (and with settings that are associated with the user profile of the identified driver, if applicable).

Turning now to the drawings, FIG. 1 is a block diagram representation of an embodiment of an automated configuration system for a vehicle 100. This description assumes that the vehicle 100 is an automobile. In practice, however, the vehicle 100 can be a watercraft, an aircraft, a spacecraft, a motorcycle, or the like. The automated configuration system includes or cooperates with a number of components, devices, or modules onboard the vehicle 100. In this regard, the automated configuration system can include or cooperate with the following elements, without limitation: a driver ID module 102; one or more onboard subsystems 104; a key fob receiver 106; a wireless receiver 108; and a user profile manager 110. FIG. 1 also depicts a number of remote or external (relative to the host vehicle 100) elements that can cooperate, interact, or communicate with the vehicle 100. In this regard, the automated configuration system can include or cooperate with the following elements, without limitation: at least one key fob 112; at least one mobile device 114; a cloud-based or web-based online service 116; and one or more mobile apps 118 (which, although depicted separately, can be installed in mobile devices 114 that interact with the vehicle 100). The online service 116 and the mobile apps 118 can communicate with the vehicle 100 using a data communication network 120. Although not shown in FIG. 1, mobile devices 114 can also communicate over the network 120.

A key fob 112 can be a keyless entry device, a device having a physical key integrated therein, a component that is physically distinct from a physical key, a simple tag or transmitter device, or the like. In some implementations, an electronic device (such as a mobile device 114) can be suitably programmed and configured to function as a key fob. Thus, the key fob 112 can be physically realized as a portable electronic device. For purposes of this description, each key fob 112 is associated with, programmed with, or configured to generate a respective key fob code that uniquely identifies that particular key fob device. Although not absolutely necessary, each key fob ideally has a globally unique key fob code assigned to it (to avoid conflicts). The key fob receiver 106 is an onboard component that is suitably configured to wirelessly communicate with key fobs 112. More specifically, the key fob receiver 106 can receive key fob codes transmitted or broadcast by the key fobs 112, and provide received key fob codes to one or more elements of the automated vehicle configuration system, such as the driver ID module 102. In FIG. 1, the wireless link 124 represents the transmission of the identifying key fob code from the key fob 112 to the key fob receiver 106. The key fob receiver 106 can be configured to communication location information of key fob devices for use by the system in determining how best to identify the user of the key fob 112.

A mobile device 114 can be any type of portable and identifiable electronic device that is typically carried or worn by a user. Although the typical use case assumes that the mobile device 114 is a wireless phone, other device platforms can be supported. In this regard, the mobile device 144 can be any of the following, without limitation: a mobile phone; a portable computing device such as a tablet, laptop, or handheld computer; a personal digital assistant; a pager device; an electronic or smart tool; a portable gaming device; a navigation device; a digital media player; a portable medical device; a camera; a video camera; an electronic toy or game; smart clothing or fashion accessories; or the like. For purposes of this description, each mobile device 114 is associated with, programmed with, or configured to generate a respective mobile device ID that uniquely identifies that particular hardware device. Although not absolutely necessary, each mobile device 114 ideally has a globally unique mobile device ID assigned to it (to avoid conflicts). In certain embodiments, the mobile device 114 is suitably configured to natively support the BLUETOOTH short range wireless communication protocol and, therefore, the mobile device ID can be the corresponding ID that is utilized by the BLUETOOTH communication protocol (i.e., the BLUETOOTH ID of the mobile device 114). More specifically, the mobile device 114 can support the BLUETOOTH low energy protocol, which is sometimes referred to as the BLE protocol or the BLUETOOTH SMART protocol. Alternatively or additionally, the mobile device 114 can be configured to support near field communication (NFC) with the vehicle. The specific wireless communication protocol supported by the mobile devices 114, and the corresponding format and configuration of the mobile device IDs, can vary from one embodiment of the system to another, and can vary depending on the platform of the mobile devices 114. Moreover, an embodiment of the automated vehicle configuration system can support a plurality of different mobile device platforms and, consequently, a plurality of different mobile device ID formats (as needed).

Depending on the particular embodiment, the mobile device 114 can generate and transmit a key fob code that is functionally equivalent to the key fob code generated by the key fob 112. In other words, a suitably configured and operated mobile device 114 can be used in lieu of a devoted key fob 112. In such a scenario, the mobile device 114 can send a key fob code and/or a wireless device identifier to the wireless receiver 108.

The wireless receiver 108 is an onboard component that is suitably configured to wirelessly communicate with mobile devices 114. Although FIG. 1 only shows one wireless receiver 108, an embodiment of the vehicle 100 can include a plurality of wireless receivers 108, which may be desirable to provide location information to the system. In practice, the wireless receiver 108 can be a wireless receiver that is compatible with one or more native short range wireless communication protocols supported by the mobile devices 114. The wireless receiver 108 may also be compatible with cellular network protocols (such as the 4G network), Wi-Fi network protocols, and the like. In certain embodiments, the wireless receiver 108 and the key fob receiver 106 can be incorporated into a single module or component. The wireless receiver 108 can receive mobile device IDs transmitted or broadcast by the mobile devices 114, and provide received mobile device IDs to one or more elements of the automated vehicle configuration system, such as the driver ID module 102. In FIG. 1, the wireless link 126 represents the transmission of the identifying mobile device ID the mobile device 114 to the wireless receiver 108. The wireless receiver 108 can also be used to receive wireless data network communications as needed to authenticate device IDs or key fob IDs.

FIG. 1 depicts the driver ID module 102, the onboard subsystems 104, and the user profile manager 110 as separate and distinct blocks for ease of illustration and clarity. An implementation of the automated vehicle configuration system, however, can utilize any number of electronic control units (ECUs) for purposes of realizing these blocks. An ECU typically includes at least one processor device, a computer readable storage medium that stores processor-executable instructions, and an input/output element such as a transceiver to facilitate communication with other ECUs onboard the vehicle. For example, the driver ID module 102 can be logically implemented in one ECU, such as the body control module of the host vehicle 100, and the user profile manager 110 can be logically implemented in another physically distinct ECU, such as the center stack module of the host vehicle 100 (which is associated with radio, entertainment, and navigation functions). Moreover, each of the onboard subsystems 104 can be physically deployed in an appropriate ECU, and a single ECU can be used to logically implement more than one functional element of the automated vehicle configuration system if so desired. To this end, the vehicle 100 can include any or all of the following ECUs, without limitation: body control module; center stack module; memory seat module; instrument panel cluster module; rear seat entertainment module; lift gate module; amplifier module; transmission module; climate control (HVAC) module; and engine control module.

The driver ID module 102 can be implemented in one or more ECUs onboard the host vehicle 100. An exemplary embodiment of the driver ID module 102 includes, without limitation: a database 130; a computer readable storage medium for storing processor-executable instructions; and at least one processor device that is configurable to execute instructions to support the functionality described in more detail herein. In this context, the processor device(s) of the ECU that implements the driver ID module 102 can be used to perform the various techniques, processes, and methods related to the operation of the automated vehicle configuration system (which are described in more detail below with reference to FIG. 2).

The database 130 includes a number of database objects corresponding to different driver IDs supported by the vehicle 100. Although any number of driver IDs and database objects can be used, the exemplary embodiment described here employs a practical limit of eight driver IDs. Each database object can be considered to be a row in a table of driver IDs, wherein each row includes data that is associated with the respective driver ID. For the exemplary embodiment described here, each database object includes, without limitation: a unique driver ID; at least one key fob code (if applicable); at least one mobile device identifier (if applicable); and a user profile status indicator. The driver ID can be any number, string, code, or the like. The example presented here uses driver IDs numbered one to eight. Key fob codes and mobile device identifiers were described above, and those values can be stored in association with a driver ID. The user profile status indicator is a simple flag that indicates yes/active or no/inactive. In this regard, if a particular driver ID has a user profile assigned to it, then the user profile status indicator will be set to indicate yes/active, otherwise, the user profile status indicator will be set to indicate no/inactive. Accordingly, the user profile status indicator can be a single-bit flag that is set to indicate one of the two possible states for each database object.

Each entry (database object) in the database 130 includes a unique driver ID. The remaining fields, however, can be dynamically populated, assigned, and reassigned in an ongoing manner. Thus, at any given time an object with a driver ID might be associated with: (1) nothing, i.e., it has not yet been used or attributes have become unassigned to the database object; (2) only a key fob code; (3) only a mobile device identifier; (4) only a user profile; (5) a key fob code and a mobile device; (6) a key fob code and a user profile; (7) a mobile device identifier and a user profile; or (8) a key fob code, a mobile device identifier, and a user profile. Notably, the system is designed to accommodate dynamic reassignment of the values in a database object, and the creation or population of new database objects, to accommodate real world situations where different people use different key fobs and mobile devices, and where each driver has individual preferences and vehicle setting configurations. This flexible architecture allows the system to dynamically add new driver ID values as needed.

The user profile manager 110 can be implemented in one or more ECUs onboard the host vehicle 100. In accordance with one contemplated embodiment, the user profile manager 110 is realized in the center stack module of the vehicle 100, wherein the center stack module includes the features and functionality related to the entertainment and navigation systems of the vehicle 100. This allows a user to create his user profile, select his user profile when in the vehicle 100, set or change his preferences or user profile settings, and the like. Accordingly, an exemplary embodiment of the user profile manager 110 may include, without limitation: a user profile database; a computer readable storage medium for storing processor-executable instructions; and at least one processor device that is configurable to execute instructions to support the functionality and feature set of the user profile manager. In this context, the processor device(s) of the ECU that implements the user profile manager 110 can be used to perform certain techniques, processes, and methods described herein.

The database of the user profile manager 110 includes a number of user profile objects (as needed) for each user profile created in a vehicle or downloaded into a vehicle, wherein each user profile object by default is assigned a unique user ID, and is associated with a driver ID. The remaining values, however, can be dynamically populated, assigned, and reassigned in an ongoing manner. Thus, at any given time an object with a user ID might be associated with: (1) nothing, i.e., it has not yet been used in a vehicle; (2) only a key fob code; (3) only a mobile device identifier; (4) only a Driver ID; (5) a key fob code and a mobile device; (6) a key fob code and a Driver ID; (7) a mobile device identifier and a Driver ID; or (8) a key fob code, a mobile device identifier, and a Driver ID. Notably, the system is designed to accommodate dynamic reassignment of the values in a database object, and the creation or population of new database objects, to accommodate real world situations where different people use their user profile in different vehicles and multiple user profiles are loaded on a given vehicle. Additional attribute values may be associated to a user ID to identify the user profile, to create preferences specific to the application of the user profile, and to create preferences to secure the user profile. The manager 110 may store vehicle preference and vehicle setting data associated with a user ID, to apply directly to the vehicle, or to instruct other modules in the vehicle to store an attribute value for a given driver ID.

As mentioned previously, the user profiles managed by the automated vehicle configuration system can be cloud-based or web-based profiles that are created on behalf of individual users. In this regard, a person can create, update, and maintain her user profile by logging into the online service 116 (e.g., a webpage associated with the manufacturer of the vehicle 100) using a mobile app 118, the mobile device 114, or any computing device having a compatible web browser. The online service 116 can also update user profile settings via communication with the vehicle 100 over the network 120. More specifically, the user profile manager 110 can send updates to the online service 116 in response to in-vehicle changes made to the person's user profile. Updated user profile settings can be downloaded from the online service 116 to the mobile apps 118 as needed. Moreover, some or all of the user profile settings can be sent from the mobile apps 118 to the onboard subsystems 104 (as applicable) such that the user profile settings can be applied or saved at the subsystem level. The onboard subsystems 104 can also communicate with the user profile manager 110 to synchronize, save, or apply user profile settings (as applicable). The user profile must be associated with a given driver ID, as settings will synchronize, save, or apply user profile settings in any module outside of the manager 110 by the given driver ID. In practice, user profiles are optional, as settings and configurations may apply remotely to a vehicle for the next use of the vehicle, rather than for the next time the user profile is used in the vehicle. Accordingly, a given driver ID need not be associated with a wireless update to a vehicle. If an update is not associated with a driver ID, then configurable user profile settings of the vehicle 100 can be set to "last used" values associated to a driver ID which is maintained for other users. "Other users" in this context are drivers who do not have a user profile. Values saved for other users are applied when no user profile is active.

In alternative embodiments, the features and functionality associated with the user profile manager 110 can be incorporated into the driver ID module 102 to eliminate the need for a separate user profile manager 110. In this regard, the database 130 of the driver ID module 102 can be expanded to include data corresponding to the user profiles.

Each onboard subsystem 104 saves its configurable settings in association with each driver ID (up to eight different driver IDs for the embodiment described here). The particular settings can be synchronized via the user profile manager 110 and/or via the mobile apps 118, as mentioned above. In addition, each onboard subsystem 104 saves configurable settings that are linked to user profiles. Thus, the onboard subsystems 104 can respond to a message (from the driver ID module 102) that includes the currently active driver ID and a user profile status indicator. More specifically, the onboard subsystems 104 receive the active driver ID and the user profile status indicator, retrieve the corresponding user-specific settings, preferences, and configuration data, and apply the settings, preferences, and configuration data in an appropriate manner to personalize or customize the vehicle 100 for the user. When the onboard subsystem is storing data linked to user profiles, the objects associated to driver IDs are only applied when the driver ID is associated to the user profile. When the user profile status indicator is not set, the module will customize the vehicle based on an object that stores a "driver other" or value of 0 for the driver ID attribute, not applying settings, preferences and configuration data based on the active driver ID. An onboard subsystem 104 that does not store data linked to a user profile may store data associated to a driver ID linked to a key fob and ignore the profile status indicator. When a key fob is dynamically associated to a driver ID, the driver ID module 102 will communicate the driver ID linked to a programmed key fob number, so that the subsystem 104 storing data applied based on an active key fob will associate that data element for a key fob number with the driver ID linked to the given key fob.

Figure 2:
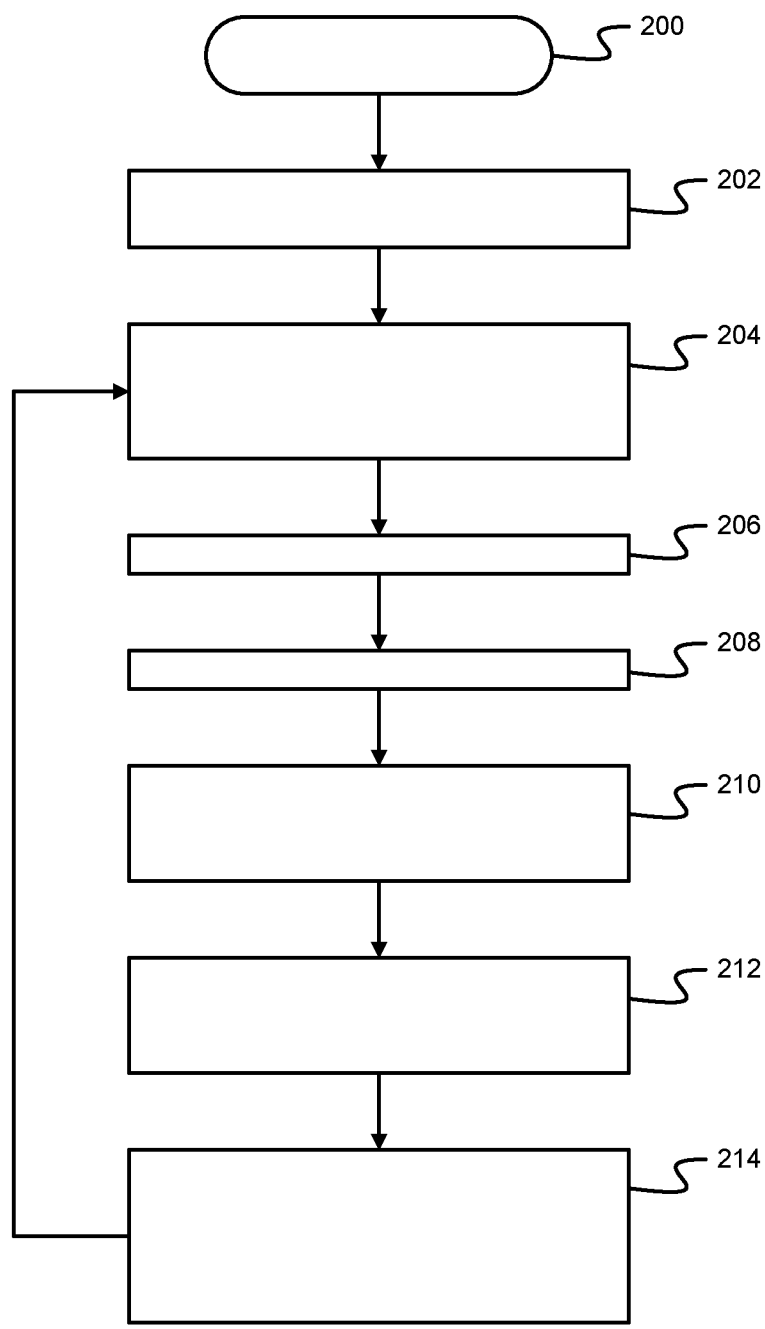
FIG. 2 is a flow chart that illustrates an embodiment of an automated vehicle configuration process.

In practice, the driver ID module 102 and the user profile manager 110 cooperate to dynamically populate and update the database 130 and to synchronize the settings of the onboard subsystems 104 in an ongoing manner. In this regard, FIG. 2 is a flow chart that illustrates an embodiment of an automated vehicle configuration process 200, which can be performed by the vehicle 100. The various tasks performed in connection with the process 200 may be performed by software, hardware, firmware, or any combination thereof. For illustrative purposes, the following description of the process 200 may refer to elements mentioned above in connection with FIG. 1. In practice, portions of the process 200 may be performed by different elements of the described system, e.g., the driver ID module 102, the user profile manager 110, or an onboard subsystem 104. It should be appreciated that the process 200 may include any number of additional or alternative tasks, the tasks shown in FIG. 2 need not be performed in the illustrated order, and the process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

This example assumes that the driver ID module 102 and its database 130 are initialized with factory settings during an appropriate manufacturing procedure of the host vehicle 100 (task 202). Assuming, for example, that the vehicle is sold with two key fobs 112, then the initial factory settings may have Key Fob 1 assigned to Driver ID 1 and Key Fob 2 assigned to Driver ID 2, and have the user profile status for both driver IDs set to Not Assigned. Thereafter, the process 200 can dynamically populate and update the database objects of the database 130 as needed to assign and reassign relevant data items to each driver ID (task 204). The dynamic updating performed during task 204 can also contemplate the addition of new key fobs or the decommission (removal) of old key fobs from the system. The dynamic updating performed during task 204 enables the system to associate mobile device identifiers to driver IDs and to assign or reassign user profiles to driver IDs as needed. A number of use case examples are described below to demonstrate how the driver ID module 102 can be dynamically updated in response to different scenarios.

The following description of the remainder of the process 200 assumes that the database 130 of the driver ID module 102 has been updated to a steady state. This example also assumes that a user (e.g., the intended driver) is approaching the vehicle 100, has unlocked the vehicle 100, or is already inside the vehicle 100. The key fob receiver 106 of the vehicle 100 can receive a key fob code (task 206) in a variety of different ways. In this regard, a key fob code can be received in response to: user activation of an unlock or start button on a key fob device; or user interaction of a mobile device (such as a smartphone) having native key fob functionality or a suitable mobile app that provides key fob functionality. As another example, a key fob code can be passively broadcast by a compatible key fob device or a compatible mobile device, and a broadcast code can be received at the vehicle when the broadcasting device is in wireless range. This description assumes that a key fob code is detected during task 206.

One or more wireless receivers 108 onboard the host vehicle 100 can receive a mobile device ID that identifies a mobile device (task 208). As explained above, the mobile device ID uniquely identifies a piece of electronic-based or computer-based hardware. This description assumes that the user is carrying or wearing a detectable mobile device (such as a smartphone, a tablet computer, or a portable video game device), and that task 208 receives the corresponding mobile device ID from the user's mobile device.

The process 200 continues by analyzing and processing at least the received key fob code and the received mobile device ID in an attempt to intelligently identify the user. More specifically, the received key fob code and the received mobile device ID can be used to search the driver ID database and to select or designate (from the different database objects) an active driver ID for use going forward (task 210). Thus, the process 200 selects and sets an active driver ID based on the received key fob code value and the received mobile device ID value. When more than one device is found, the driver ID that is associated with a user profile is used to select driver ID. If more than one device is associated to a driver ID with an associated user profile, then location of the device indicating the driver of the vehicle is used to select driver ID. If more than one device is associated to a driver ID with an associated user profile and the location of the devices does not identify the driver, then the most recent used driver ID for the devices present is selected. Ideally, the chosen active driver ID will accurately correspond to the person who will be driving the vehicle 100.

The process 200 continues by communicating the active driver ID to the different onboard subsystems 104 (task 212). As mentioned above, each driver ID can also be linked to a user profile, although the creation and maintenance of a user profile is optional. For this particular embodiment, the driver ID database indicates whether or not each driver ID is assigned to a user profile. Thus, task 212 also communicates the user profile status indicator for the active driver ID to the different onboard subsystems 104. Alternatively or additionally, in task 212 the user profile manager 110 can communicate a user profile ID to the onboard subsystems 104 storing data associated with the user profile ID, wherein user profile IDs are uniquely assigned to users that have created a user profile.

This description assumes that the various onboard subsystems 104 receive and process the active driver ID and the user profile status indicator associated with the active driver ID. Each onboard subsystem 104 responds in an appropriate manner to load and apply its user-specific settings (task 214). In this way, the process 200 configures the onboard subsystems 104 with appropriate user-specific settings that are associated with the active user ID. Moreover, if the active driver ID has a user profile assigned to it (i.e., the user profile status indicator is set to Yes, Active, Assigned, or the like), then task 214 can load and apply certain profile-specific settings. Depending on its specific functionality, configuration, and/or operating status, a given subsystem can be customized or configured with settings that are associated only with the active driver ID. More specifically, if the user profile status indicator corresponding to the active driver ID communicated to the subsystem has a value of "not profile-assigned", then the subsystem utilizes settings associated with only the active drier identifier and not associated with a user profile. If, however, the user profile status indicator corresponding to the active driver ID has a value of "profile-assigned", then the subsystem utilizes settings associated with the active driver identifier and its associated user profile.

Notably, user-specific configurable settings that are associated with an active user profile are saved for that user profile whenever the vehicle is shut down (ignition off) and whenever the system detects a switch from the active user profile to a new user profile. This important feature allows the system to contemplate changes made to personal settings before switching to another user profile.

FIG. 2 depicts task 214 leading back to task 204; this represents the ongoing and dynamic nature of the process 200. In this regard, subsequent iterations of the process 200 can contemplate changes to the driver ID database 130. As explained above, the dynamic nature of the driver ID database 130 allows the system to contemplate use of key fobs by different drivers, the assignment and reassignment of user profiles, the use and reuse of driver IDs, and the like.

Although this example assumes that the process 200 makes a decision based on a key fob code and a mobile device ID, other scenarios are also contemplated. For example, if a key fob code is detected and only one driver ID may be linked to the received key fob code, then that driver ID is designated as the active driver ID. More than one key fob code may be linked to a driver ID. Otherwise, the system can select the last-used driver ID associated with the received key fob code for use as the active driver ID. Moreover, the system can be enhanced or expanded as needed to consider other types of data and information when determining which driver ID to designate as the active driver ID. In such embodiments, the driver ID database 130 can be modified to include additional fields in each database object. For example, the system can be modified to detect and consider any of the following, without limitation: vehicle geographic location; geographic position data provided by a key fob device and/or a mobile device; whether the key fob device approached the vehicle from the driver side or the passenger side; whether the mobile device approached the vehicle from the driver side or the passenger side; biometric data collected by one or more onboard sensors or cameras; weight of the user as detected by a driver seat scale component; voice recognition; and calendar data (time of day, day of the week, month, etc.).

A number of situations will now be described to demonstrate the manner in which the system dynamically responds to different operating conditions. These examples are provided for ease of understanding in the context of an exemplary embodiment of the system, and they are not intended to address all possible scenarios. In addition, these examples are not intended to restrict or otherwise limit the scope or application of the described subject matter. For simplicity and the sake of clarity, the examples are presented in chronological order that reflect ongoing updates to the system.

Example 1: Factory Settings

For this scenario, assume that the factory settings of the vehicle assign Key Fob 1 to Driver ID 1, and Key Fob 2 to Driver ID 2, and that Driver ID 1 and Driver ID 2 are not profile-assigned. If Key Fob 1 is detected, then the driver ID module 102 sets Driver ID 1 as the active driver ID, and the onboard subsystems respond accordingly. For this example, the subsystems apply last-used settings as appropriate, or apply settings programmed to be set based on the active key fob.

Example 2: User Profile Created and Assigned to Key Fob 1

This example assumes that: Key Fob 1 is detected; a user named Doug creates or loads his user profile; and Doug instructs the system to associate his user profile with Key Fob 1. This results in the following: Driver ID 1 is assigned to Key Fob 1 and is profile-assigned, and Driver ID 1 is associated to Doug's user profile.

Example 3: User Profile Created for a New User

This example assumes that Key Fob 1 is detected while in the possession of a user named Teryn, and that she decides to create or load her own user profile. The system reacts by assigning an available driver ID to Teryn's user profile (this occurs because Key Fob 1 is already assigned to Driver ID 1), and by designating the new driver ID as profile-assigned. This results in the following: Driver ID 3 is profile-assigned to Teryn's user profile. Note that Driver ID 3 is not associated with Key Fob 1 at this time. Nonetheless, Teryn's user-specific settings can still be saved in association with Driver ID 3 and her user profile.

Example 4: User Profile Created and Assigned to Key Fob 2

This example assumes that: Key Fob 2 is detected; a user named Mark creates or loads his user profile; and Mark instructs the system to associate his user profile with Key Fob 2. This results in the following: Driver ID 2 is assigned to Key Fob 2 and is profile-assigned to Mark's user profile. At this point, the driver ID mappings will be as shown in Table 1 below.

TABLE 1

| Key Fob | Mobile Device | Driver ID | Profile Assigned | User |
|---|---|---|---|---|
| KF1 | | ID1 | 1 | Doug |
| KF2 | | ID2 | 1 | Mark |
| | | ID3 | 1 | Teryn |
| | | ID4 | 0 | |
| | | ID5 | 0 | |
| | | ID6 | 0 | |
| | | ID7 | 0 | |
| | | ID8 | 0 | |

Example 5: Key Fob 2 Detected and User Profile Changed

This example assumes that Key Fob 2 is initially detected. Accordingly, the system will set Driver ID 2 as the active driver ID. As reflected in Table 1, Driver ID 2 has an active user profile status indicator (i.e., the value of 1), and Key Fob 2 and Driver ID 2 are initially linked to Mark's user profile. After the system initializes, however, the user named Teryn selects her user profile. This effectively overrides the initial configuration and causes the system to set Driver ID 3 (which is assigned to Teryn's user profile) as the active driver ID. Consequently, the applicable subsystems are configured with settings that are associated with Driver ID 3 and with settings that are associated with Teryn's user profile. Note that the status of the driver ID mappings remain as shown in Table 1 above.

Example 6: Key Fob 2 Reassigned

This example assumes that Teryn is the active user. Accordingly, the system will set Driver ID 3 as the active driver ID and proceed as outlined above. After the system initializes, however, the user named Teryn instructs the system to reassign Key Fob 2 to her (instead of Mark). The system responds by reassigning Key Fob 2 to Driver ID 3 (which is already assigned to Teryn's user profile). This action also links Teryn's user profile to Key Fob 2. At this point, the driver ID mappings are as shown in Table 2 below.

TABLE 2

| Key Fob | Mobile Device | Driver ID | Profile Assigned | User |
|---|---|---|---|---|
| KF1 | | ID1 | 1 | Doug |
| | | ID2 | 1 | Mark |
| KF2 | | ID3 | 1 | Teryn |
| | | ID4 | 0 | |
| | | ID5 | 0 | |
| | | ID6 | 0 | |
| | | ID7 | 0 | |
| | | ID8 | 0 | |

Example 7: Key Fob 3 Introduced and Programmed

This scenario assumes that a new key fob (Key Fob 3) has been programmed for use with the vehicle. The system selects the next open driver ID slot that is not profile-assigned or associated with a mobile device or any other attributes associated to the driver ID object, and associates the new key fob with that driver ID. After deploying the new key fob, the driver ID mappings are as depicted in Table 3 below.

TABLE 3

| Key Fob | Mobile Device | Driver ID | Profile Assigned | User |
|---|---|---|---|---|
| KF1 | | ID1 | 1 | Doug |
| | | ID2 | 1 | Mark |
| KF2 | | ID3 | 1 | Teryn |
| KF3 | | ID4 | 0 | |
| | | ID5 | 0 | |
| | | ID6 | 0 | |
| | | ID7 | 0 | |
| | | ID8 | 0 | |

Example 8: Key Fob 3 Detected and User Profile Selected

This example assumes that Key Fob 3 is initially detected, and that the user named Mark selects his user profile. The system reacts by making Driver ID 2 the active driver ID, because Driver ID 2 is already associated with Mark's user profile. Thus, the applicable subsystems are configured with settings that are associated with Driver ID 2 and with settings that are associated with Mark's user profile. Note that the status of the driver ID mappings remain as shown in Table 3 above.

Example 9: Key Fob 3 is Reassigned

This example represents a continuation of the scenario outlined in Example 8. Here, the user named Mark decides to assign Key Fob 3 to his user profile. The system responds by associating Key Fob 3 with Driver ID 2 (which is already assigned to Mark), which is profile-assigned to Mark's user profile. At this time, the updated driver ID mappings are as depicted in Table 4 below.

TABLE 4

| Key Fob | Mobile Device | Driver ID | Profile Assigned | User |
|---|---|---|---|---|
| KF1 | | ID1 | 1 | Doug |
| KF3 | | ID2 | 1 | Mark |
| KF2 | | ID3 | 1 | Teryn |
| | | ID4 | 0 | |
| | | ID5 | 0 | |

TABLE 4-continued

| Key Fob | Mobile Device | Driver ID | Profile Assigned | User |
|---|---|---|---|---|
| | | ID6 | 0 | |
| | | ID7 | 0 | |
| | | ID8 | 0 | |

Example 10: Key Fob 1 Detected and Mobile Device 1 Assigned

This example assumes that the system detects Key Fob 1 and, therefore, initially designates Driver ID 1 as the active driver ID. For this scenario, a user named Cody creates or loads his user profile and associates a detectable mobile device. The system responds by selecting the next available driver ID slot that is not profile-assigned and not associated with any key fob or mobile device or other attribute associated with the driver ID, and by making the appropriate associations for that driver ID. For this example, the new driver ID is Driver ID 4, and the system associates a mobile device ID and Cody's user profile to Driver ID 4. At this time, the updated driver ID mappings are as depicted in Table 5 below.

TABLE 5

| Key Fob | Mobile Device | Driver ID | Profile Assigned | User |
|---|---|---|---|---|
| KF1 | | ID1 | 1 | Doug |
| KF3 | | ID2 | 1 | Mark |
| KF2 | | ID3 | 1 | Teryn |
| | MD1 | ID4 | 1 | Cody |
| | | ID5 | 0 | |
| | | ID6 | 0 | |
| | | ID7 | 0 | |
| | | ID8 | 0 | |

Example 11: Mobile Device 2 Detected

This example assumes that the system detects a new mobile device ID that identifies Mobile Device 2 (which is owned or carried by the user Teryn), and no other key fob or mobile device is found. The new mobile device ID can be automatically broadcast by Mobile Device 2, or it can be broadcast in response to a request or command initiated by the user, e.g., a request to utilize Mobile Device 2 as a key fob device for the vehicle or a request to otherwise utilize Mobile Device 2 in the system as described herein. The system responds by selecting the next available driver ID slot that is not profile-assigned, and by linking Mobile Device 2 to that driver ID. For this example, the new driver ID is Driver ID 5, and the system associates the detected mobile device ID to Driver ID 5. At this time, the updated driver ID mappings are as depicted in Table 6 below. Notably, Driver ID 5 is not assigned to a user profile at this time.

TABLE 6

| Key Fob | Mobile Device | Driver ID | Profile Assigned | User |
|---|---|---|---|---|
| KF1 | | ID1 | 1 | Doug |
| KF3 | | ID2 | 1 | Mark |
| KF2 | | ID3 | 1 | Teryn |
| | MD1 | ID4 | 1 | Cody |
| | MD2 | ID5 | 0 | |
| | | ID6 | 0 | |

TABLE 6-continued

| Key Fob | Mobile Device | Driver ID | Profile Assigned | User |
| --- | --- | --- | --- | --- |
|  |  | ID7 | 0 |  |
|  |  | ID8 | 0 |  |

Example 12: Mobile Device 2 Assigned to a User Profile

This example represents a continuation of the scenario outlined in Example 11. Here, Teryn uses Mobile Device 2 to enter and start the vehicle. Mobile Device 2 is associated with Driver ID 5, and Driver ID 5 becomes active. Since Driver ID 5 is not set to profile-assigned, the subsystems do not apply any data stored associated with the Driver ID 5 object. The vehicle retains and applies settings and configurations, as it was when the vehicle last shut down with no user profile assigned. The user named Teryn selects her user profile and instructs the system to assign her mobile device (Mobile Device 2) to her user profile. The system responds by making Driver ID 3 (which is already associated with Teryn's user profile) the active driver ID, and by associating Mobile Device 2 with Driver ID 3. The applicable subsystems are configured with settings that are associated with Driver ID 3 and with settings that are associated with Teryn's user profile. At this time, the updated driver ID mappings are as shown in Table 7 below.

TABLE 7

| Key Fob | Mobile Device | Driver ID | Profile Assigned | User |
| --- | --- | --- | --- | --- |
| KF1 |  | ID1 | 1 | Doug |
| KF3 |  | ID2 | 1 | Mark |
| KF2 | MD2 | ID3 | 1 | Teryn |
|  | MD1 | ID4 | 1 | Cody |
|  |  | ID5 | 0 |  |
|  |  | ID6 | 0 |  |
|  |  | ID7 | 0 |  |
|  |  | ID8 | 0 |  |

Example 13: Key Fob 1 Detected and User Profile Deleted

This example assumes that the system initially detects Key Fob 1 and, therefore, loads Doug's user profile. This example also assumes that a user named Sue is carrying Key Fob 1, and that Sue decides to delete Cody's user profile. The system responds to the user profile delete request by removing Cody's user profile association with Driver ID 4, and by designating Driver ID 4 as profile-unassigned. Accordingly, the subsystems are configured with settings that are associated with Driver ID 1 and with settings that are associated with Doug's user profile. At this time, the updated driver ID mappings are as shown in Table 8 below.

TABLE 8

| Key Fob | Mobile Device | Driver ID | Profile Assigned | User |
| --- | --- | --- | --- | --- |
| KF1 |  | ID1 | 1 | Doug |
| KF3 |  | ID2 | 1 | Mark |
| KF2 | MD2 | ID3 | 1 | Teryn |
|  | MD1 | ID4 | 0 |  |
|  |  | ID5 | 0 |  |
|  |  | ID6 | 0 |  |

TABLE 8-continued

| Key Fob | Mobile Device | Driver ID | Profile Assigned | User |
| --- | --- | --- | --- | --- |
|  |  | ID7 | 0 |  |
|  |  | ID8 | 0 |  |

Example 14: Key Fob 1 Reassigned

For this example, the user named Sue creates or loads her user profile, and reassigns Key Fob 1 to herself. The system responds by associating Sue's user profile to the next open and profile-unassigned driver ID: Driver ID 5. Moreover, the system disassociates Key Fob 1 from Driver ID 1 and Doug's user profile, and reassigns Key Fob 1 to Driver ID 5 and Sue's user profile. Thereafter, configurable settings will be saved in association with Driver ID 5 and Sue's user profile. At this time, the updated driver ID mappings are as shown in Table 9 below.

TABLE 9

| Key Fob | Mobile Device | Driver ID | Profile Assigned | User |
| --- | --- | --- | --- | --- |
|  |  | ID1 | 1 | Doug |
| KF3 |  | ID2 | 1 | Mark |
| KF2 | MD2 | ID3 | 1 | Teryn |
|  | MD1 | ID4 | 0 |  |
| KF1 |  | ID5 | 1 | Sue |
|  |  | ID6 | 0 |  |
|  |  | ID7 | 0 |  |
|  |  | ID8 | 0 |  |

Example 15: Key Fob 1 Reassigned

This example assumes that the user named Doug accesses the vehicle using Key Fob 1, which is detected by the onboard system, and decides to reassign Key Fob 1 to his user profile. Accordingly, Doug selects and loads his user profile, which causes the system to set Driver ID 1 as the active driver ID. Thereafter, the system associates Key Fob 1 to Driver ID 1 and Doug's user profile. The vehicle subsystems are configured with the settings linked to Driver ID 1 and with settings linked to Doug's user profile. At this time, the updated driver ID mappings are as shown in Table 10 below.

TABLE 10

| Key Fob | Mobile Device | Driver ID | Profile Assigned | User |
| --- | --- | --- | --- | --- |
| KF1 |  | ID1 | 1 | Doug |
| KF3 |  | ID2 | 1 | Mark |
| KF2 | MD2 | ID3 | 1 | Teryn |
|  | MD1 | ID4 | 0 |  |
|  |  | ID5 | 1 | Sue |
|  |  | ID6 | 0 |  |
|  |  | ID7 | 0 |  |
|  |  | ID8 | 0 |  |

Example 16: Mobile Device 2 Detected

This example assumes that the user Teryn returns to the vehicle without a key fob, but carrying her previously registered mobile device (Mobile Device 2). As reflected in Table 10 above, detection of Mobile Device 2 by itself is sufficient to load Teryn's user profile and to cause the system to set Driver ID 3 as the currently active driver ID. Consequently, the vehicle subsystems are configured with the settings linked to Driver ID 3 and with settings linked to Teryn's user profile; the driver ID mappings remain unchanged.

As the foregoing examples demonstrate, the driver ID module 102 is designed to provide the dynamic ability to identify the current user/driver of the vehicle 100, by detecting the presence of multiple devices (a key fob device, a wireless mobile device, etc.). The driver ID module 102 determines which driver ID to set as the active one, based on which available device is associated to a user profile. Driver ID database objects can dynamically store vehicle configuration by user profile, or by mobile device, or by key fob device. In this regard, a single driver ID can be associated with a key fob device with or without one or more distinct mobile devices. Assignment of key fob devices and mobile devices to a driver ID can be managed by users, via interaction with an onboard system.

Although specific rules and requirements can vary from one embodiment to another, the following rules apply to the exemplary implementation presented herein: (1) every user profile is linked to a driver ID; (2) a driver ID can be linked to only one user profile at any given time; (3) a driver ID need not be linked to any user profile; (4) a key fob device can be linked to only one driver ID at any given time; (5) a mobile device can be associated to only one driver ID at any given time; (6) a driver ID and a user profile can be associated to both a key fob device and a mobile device; (7) a mobile device (that is not a key fob device) can be associated to a driver ID.

By having every user profile associated to a driver ID, the user profile's settings for features outside of the center stack module (CSM) can be saved to a user profile before the CSM is booted. The system detects the device used to start the vehicle and loads the corresponding user profile, which enables a user's preferences to be applied before the CSM is awake. This also allows the user to switch profiles such that the active profile's settings are applied and saved for the active profile regardless of the device used to start the vehicle.

When the active driver ID is broadcast to the onboard subsystems, if it is not profile-assigned, then the modules storing data tied to a user profile will not apply any saved data to the vehicle. Modules that are directly tied to a key fob can apply settings by driver ID, whether or not it is profile-assigned. The CSM can link a new user profile to an active driver ID that is not already profile-assigned. If the active driver ID is already assigned to a user profile, the CSM may request the next driver ID that is available.

If a new user profile is assigned to a driver ID, the driver ID is made active prior to setting the driver ID to profile-assigned. During profile creation, the active driver ID is not set as profile-assigned, therefore, any stored data or factory defaults associated with the driver ID would not be immediately applied. After the user profile is created and the driver ID is already active, then the profile-assigned indicator is set to Yes, True, etc. When the user signs out or the vehicle shuts down with the profile-assigned indicator set to Yes, the subsystem modules save the user's configurations, preferences, and the like.

User profile settings are saved at log-off or at ignition off, enabling modules to recall the "last used" configuration for a user. When a user profile becomes active, the associated driver ID also becomes active, and the subsystem modules will apply the "last used" configuration. After the driver ID has been made active, then the driver ID can be set to profile-assigned. When the vehicle shuts down, a logoff signal (or a save signal) can be sent for the driver ID that is profile-assigned. For a profile change, the driver ID module sends signals to save current user data and activate the new user's driver ID. Modules/components outside of the CSM can store user profile data even if the user profile is not linked to a key fob or a mobile device, and even if the mobile device is not functioning as a key fob device.

Figure 3:
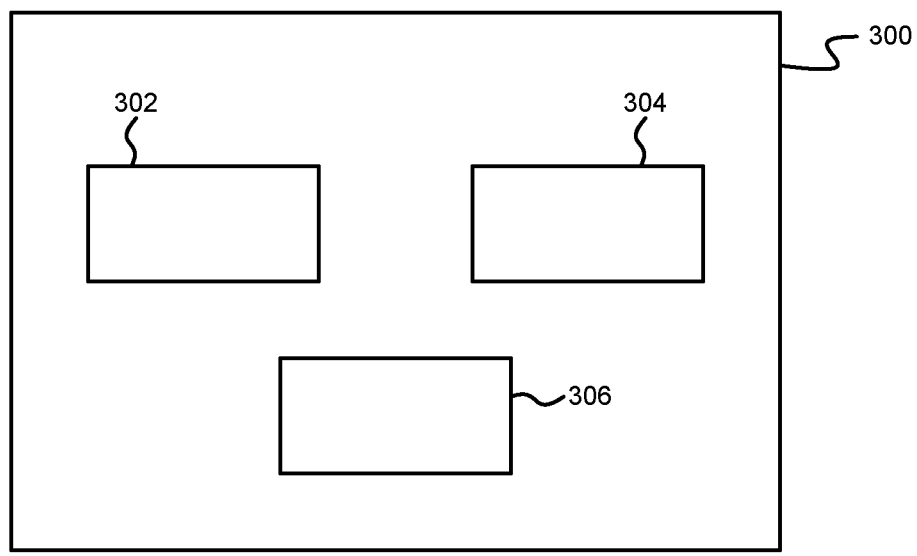
FIG. 3 is a block diagram representation of an embodiment of an electronic control unit suitable for use in a vehicle.

As mentioned previously, the automated configuration system can be implemented using one or more ECUs onboard the host vehicle 100. Indeed, the driver ID module 102 can be realized with an ECU, such as the body control module of the vehicle 100. In this regard, FIG. 3 is a block diagram representation of an embodiment of an ECU 300 suitable for use in the vehicle 100. Although one ECU 300 can manage the described functionality, various embodiments may employ a plurality of ECUs 300 to support the functionality in a cooperative and distributed manner. The illustrated embodiment of the ECU 300 generally includes, without limitation: at least one processor device 302; at least one computer-readable storage medium 304; and an input/output module 306 (e.g., a suitably configured transceiver). In practice, the ECU 300 may include additional elements, devices, and functional modules that cooperate to achieve the desired functionality.

The processor device 302 is capable of executing the processor-executable instructions stored in the computer-readable storage medium 304, wherein the instructions cause the ECU 300 to perform the various processes, operations, and functions for which it is responsible. In practice, the processor device 302 may be implemented as a microprocessor, a number of discrete processor devices, content addressable memory, an application specific integrated circuit, a field programmable gate array, any suitable programmable logic device, discrete gate or transistor logic, discrete hardware components, or any combination designed to perform the desired functions.

The storage medium 304 (and/or any general purpose memory or storage element) may be utilized to store program code that defines an operating system, a boot loader, or a BIOS for the ECU 300. Moreover, the storage medium 304 may include random access memory that serves as temporary data storage for the processor device 302. In this regard, the processor device 302 can write to and read from the storage medium 304 as needed to support the operation of the ECU 300.

The input/output module 306 may be realized using software, firmware, hardware, processing logic, or any suitable combination thereof. In certain exemplary embodiments, the input/output module 306 is suitably configured to support data communication between the ECU 300 and other modules, ECUs, sensors, or devices onboard the host vehicle 100. The input/output module 306 may also be designed to support data communication with external devices or sources. For example, the input/output module 306 may be used to communicate with the online service 116, the mobile apps 118, key fobs 112, mobile devices 114, or the like. As another example, the input/output module 306 can be used to receive output data from "external" sensors that are not otherwise coupled to the communication network onboard the vehicle 100.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated vehicle configuration system for a host vehicle, comprising:
 a driver identifier module onboard the host vehicle, the driver identifier module comprising a database, a computer readable storage medium storing processor-executable instructions, and a processor device to execute the processor-executable instructions, the database comprising a plurality of database objects, each of the database objects comprising a driver identifier field, a key fob code field, a user name field, a profile assignment field, and a mobile device identifier field, and the processor device configured to execute the processor-executable instructions to dynamically populate and update the database objects such that key fob codes are dynamically assigned and reassigned to driver identifiers in accordance with the following rules and requirements: every user profile is linked to a driver identifier; a given driver identifier can be linked to only one user profile at any given time; driver identifiers need not be linked to user profiles; a key fob can be linked to only one driver identifier at any given time; a particular driver identifier and a particular user profile can be associated to both a key fob device and a mobile device; and mobile devices can be associated to driver identifiers; and
 a subsystem onboard the host vehicle, the subsystem having user-specific configurable settings associated with the driver identifier objects.

2. The system of claim 1, wherein the processor device is configured to execute the processor-executable instructions to dynamically populate and update the database objects such that mobile device identifiers are dynamically assigned and reassigned to driver identifiers.

3. The system of claim 1, wherein the processor device is configured to execute the processor-executable instructions to dynamically populate and update the database objects such that user profiles are dynamically assigned and reassigned to driver identifiers.

4. The system of claim 1, further comprising:
 a key fob receiver to receive key fob codes that identify key fob devices; and
 a wireless receiver to receive mobile device identifiers that identify mobile devices;
 wherein the processor device is configured to execute the processor-executable instructions to process one or more received key fob codes, one or more key fob locations, one or more received mobile device identifiers, and one or more received mobile device locations, to identify a driver from the plurality of database objects, and to select an active driver identifier that corresponds to the one or more received key fob codes and the one or more received mobile device identifiers.

5. The system of claim 4, wherein the wireless receiver communicates location information of the mobile devices.

6. The system of claim 4, wherein the key fob receiver communicates location information of the key fob devices.

7. The system of claim 4, wherein the processor device is configured to execute the processor-executable instructions to communicate the active driver identifier and associated key fob to the subsystem, instructing the subsystem to update a key fob object with the driver identifier, wherein the subsystem utilizes settings associated with the active driver identifier for a given key fob.

8. The system of claim 4, wherein the processor device is configured to execute the processor-executable instructions to communicate a user profile status indicator associated with the active driver identifier to the subsystem, wherein the subsystem utilizes settings associated with only the active driver identifier and not associated with a user profile when the user profile status indicator indicates that no user profile is assigned to the active driver identifier.

9. The system of claim 4, wherein the processor device is configured to execute the processor-executable instructions to communicate a user profile status indicator associated with the active driver identifier to the subsystem, wherein the subsystem utilizes settings associated with the active driver identifier and an associated user profile when the user profile status indicator indicates that a user profile is assigned to the active driver identifier.

10. The system of claim 9, wherein the subsystem saves user-specific configurable settings associated with the user profile when the host vehicle is shut down and in response to detection of a change from the user profile to a new user profile.

11. The system of claim 4, wherein the processor device is configured to execute the processor-executable instructions to communicate a user profile identifier to the subsystem, wherein the subsystem utilizes settings associated with only the user profile identifier and not with the driver identifier.

12. The system of claim 1, further comprising a user profile manager operatively coupled to the driver identifier module, the user profile manager comprising a user profile database, a computer readable storage medium storing processor-executable instructions, and a processor device to execute the processor-executable instructions, the user profile manager comprising a plurality of user profile objects, each of the user profile objects associating a driver identifier with a user profile.

13. A vehicle comprising:
 a key fob receiver to receive a key fob code that identifies a key fob device;
 a short range wireless receiver to receive a mobile device identifier that identifies a mobile device;
 a user profile module comprising a database, a computer readable storage medium storing processor-executable instructions, and a processor device to execute the processor-executable instructions, the database comprising a plurality of database objects, each of the database objects comprising a driver identifier field, a key fob code field, a user name field, a profile assignment field, and a mobile device identifier field, and the processor device configured to execute the processor-executable instructions to dynamically populate and update the database objects such that key fob codes are dynamically assigned and reassigned to user profile identifiers in accordance with the following rules and requirements: every user profile is linked to a driver identifier; a given driver identifier can be linked to only one user profile at any given time; driver identifiers need not be linked to user profiles; a key fob can be linked to only one driver identifier at any given time; a particular driver identifier and a particular user profile can be associated to both a key fob device and a mobile device; and mobile devices can be associated to driver identifiers; and a subsystem onboard the host vehicle, the subsystem having user-specific configurable settings associated with the driver identifiers and with user profile identifiers;

wherein the processor device is configured to execute the processor-executable instructions to process the received key fob code and the received mobile device identifier, and to select, from the plurality of database objects, an active user profile identifier that corresponds to the received key fob code and the received mobile device identifier.

14. The vehicle of claim 13, wherein the processor device is configured to execute the processor-executable instructions to dynamically populate and update the database objects such that mobile device identifiers are dynamically assigned and reassigned to driver identifiers.

15. The vehicle of claim 13, further comprising a user profile manager, the user profile manager comprising a user profile database, a computer readable storage medium storing processor-executable instructions, and a processor device to execute the processor-executable instructions, the user profile manager comprising a plurality of user profile objects, each of the user profile objects associating a driver identifier with a user profile.

16. The vehicle of claim 15, wherein the driver identifier module dynamically populates and updates the database objects in response to instructions from the user profile manager.

17. An automated vehicle configuration system for a host vehicle, comprising:
a key fob receiver to receive a key fob code that identifies a key fob device;
a short range wireless receiver to receive a mobile device identifier that identifies a mobile device associated with a user; and
a driver identifier module comprising a processor device and a computer readable storage medium storing processor-executable instructions, wherein the processor device is configurable to execute the processor-executable instructions to:
process the received key fob code and the received mobile device identifier;
select one of a plurality of driver identifiers to serve as an active driver identifier, the selection determined by a user profile manager; and
communicate the active driver identifier to a subsystem of the host vehicle, wherein the subsystem loads user-specific settings associated with the active driver identifier;

wherein the driver identifier module comprises a database having a plurality of database objects, each of the database objects comprising a driver identifier field, a key fob code field, a user name field, a profile assignment field, and a mobile device identifier field, and the processor device configurable to execute the processor-executable instructions to dynamically populate and update the database objects such that key fob codes and mobile device identifiers are dynamically assigned and reassigned to driver identifiers in response to instructions from the user profile manager and in accordance with the following rules and requirements: every user profile is linked to a driver identifier; a given driver identifier can be linked to only one user profile at any given time; driver identifiers need not be linked to user profiles; a key fob can be linked to only one driver identifier at any given time; a particular driver identifier and a particular user profile can be associated to both a key fob device and a mobile device; and mobile devices can be associated to driver identifiers.

18. The system of claim 17, further comprising:
a user profile manager comprising a user profile database having a plurality of user profile objects, each of the user profile objects comprising a profile-assigned driver identifier, wherein in response to user selection of a particular user profile having a particular profile-assigned driver identifier associated therewith, the user profile manager communicates with the driver identifier module to designate the particular profile-assigned driver identifier as the active driver identifier.

19. The system of claim 17, wherein the processor device is configurable to execute the processor-executable instructions to dynamically populate and update the database objects such that a user profile status indicator is dynamically set for driver identifiers.

* * * * *